(12) United States Patent
Price

(10) Patent No.: US 8,898,713 B1
(45) Date of Patent: Nov. 25, 2014

(54) CONTENT AGGREGATION AND PRESENTATION

(75) Inventor: Roy F. Price, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 885 days.

(21) Appl. No.: 12/872,883

(22) Filed: Aug. 31, 2010

(51) Int. Cl.
*H04N 7/173* (2011.01)

(52) U.S. Cl.
USPC ............. 725/94; 725/21; 725/93; 725/95

(58) Field of Classification Search
USPC ............... 725/21, 22, 28, 89, 93–95
See application file for complete search history.

(56) References Cited

U.S. PATENT DOCUMENTS

| | | | | |
|---|---|---|---|---|
| 5,754,938 | A * | 5/1998 | Herz et al. | 725/116 |
| 6,177,931 | B1 * | 1/2001 | Alexander et al. | 725/52 |
| 7,690,013 | B1 * | 3/2010 | Eldering et al. | 725/36 |
| 2003/0028889 | A1 * | 2/2003 | McCoskey et al. | 725/91 |
| 2007/0113250 | A1 * | 5/2007 | Logan et al. | 725/46 |

OTHER PUBLICATIONS http://gigaom.com/2008/11/03/harnessing-the-power-of-itunes-star-ratings/ Nov. 3, 2008.*
http://lifehacker.com/369747/download-music-from-your-friends-itunes-libraries-over-the-internet-with-mojo Mar. 19, 2008.*
http://www.howtogeek.com/howto/17407/how-to-create-auto-playlists-in-windows-media-player-12/ May 17, 2010.*
"About iCurrent' A Personalized News Aggregator", iCurrent.com retrieved on Aug. 5, 2010 at <<http://iCurrent.com/about>>, 2 pages.
"Explore section and "magic" ranking", Google Reader Help, retrieved on Jul. 12, 2010 at <<http://www.google.com/support/reader/bin/answer.py?hl=en&answer=164681>>, 1 page.
"Stitcher.com—FAQs", retrieved on Jul. 12, 2010 at <<http://stitcher.com/faqs.php>>, 19 pages.

* cited by examiner

*Primary Examiner* — Hunter B Lonsberry
(74) *Attorney, Agent, or Firm* — Lee & Hayes, PLLC

(57) ABSTRACT

Techniques for providing personalized presentations of aggregated content items are described herein. These techniques may aggregate individual content items from multiple sources, filter the content items based on the preferences of a user, and create an ordered presentation of the content items. A different presentation may be available to the user at different times, for example, a new presentation may be available each day. The new presentation may include more recent or more relevant content items than previous presentations of content items. Each presentation may combine the multiple individual content items together in such a way that each individual content item appears to the user as part of a single content item. User interaction with the aggregation of content items may be analyzed and that analysis may be used to modify subsequent selection and ordering of content items in future presentations.

32 Claims, 7 Drawing Sheets

CONTENT AGGREGATION AND PRESENTATION

BACKGROUND

The Internet and other modes of communication create vast amounts of media for people to consume. A person may receive content from really simple subscription (RSS) feeds, e-mails from friends, tweets, browsing of websites, notifications from social networking sites, text searches, television, newspapers, and multiple other sources. Checking multiple accounts and websites for sources of media may take several hours for a "well-connected" person. As the threshold amount of effort required to check many disparate sources of media increases, the convenience of the Internet and media sources decreases. With too much information, some people may give up and stop accessing some or all of these media sources and miss out on potentially interesting content.

If simplicity was paramount, a person might choose to receive a morning newspaper or to view the evening news. Each of these media sources is easy to locate and conveniently packaged—the newspaper shows up on the doorstep every morning and the TV news is broadcast every evening. However, there is no individual customization beyond selecting a newspaper or news broadcast.

Providing techniques to access to the plethora of media available from the Internet, and other sources, in a personalized manner without requiring significant effort to locate interesting and relevant content would be desirable to many people.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to, in part, providing a user with a customized combination of media or other content items. As discussed above, large amounts of media is available in various electronic forms, but because of the vast amounts of media and the disparate formats in which the media is presented it may be challenging for a user to access media of interest. Content aggregators may include content from multiple sources, but generally the content is all similar in format (e.g., text articles from multiple websites). Users may wish to have the combination of text from websites, videos from a cable TV system, short text messages from friends, and such combined into a single package. A personalized report based on a user's preferences may be created and provided to the user in a form similar to a customized television show or newspaper. Rather than viewing the articles and topics selected by a TV or newspaper editor, the user is able to receive an aggregation of content items that has been customized based on his or her preferences. This customized aggregation of items may be pushed to the user by, for example, sending a video file to a television or sending a text file to electronic book reader device. This way, the user may receive something that is as easy to access as watching TV or reading a newspaper, but is customized and up to date.

For instance, the user may sit down every evening to watch his or her customized video report that starts with a video from a major news network, includes a humorous video that was recommended by one of the user's friends, and ends with a personal video message sent from a family member. On a different day, the video report may include the same types of videos in the same order, but the specific videos may be different due to changes in the news, changing recommendations of friends, new videos in a video e-mail inbox, etc. An analogous type of presentation may be presented textually, or with text and pictures, on a mobile computing device like an electronic book reader device. This presentation may have a format like a newspaper with the articles that have the highest match to the user preferences presented first, the second highest matching article presented second, and so forth. Further, some aggregate content items may include a multitude of different types of content items, such as videos, articles, and the like.

The described techniques for presenting aggregate content items from multiple sources to the user may be implemented in a number of ways and in a number of contexts. One example implementation and context is provided with reference to the following figures, as described below in more detail. It is to be appreciated, however, that the following implementation and context is but one of many.

Illustrative Environment and System Architecture

Figure 1:
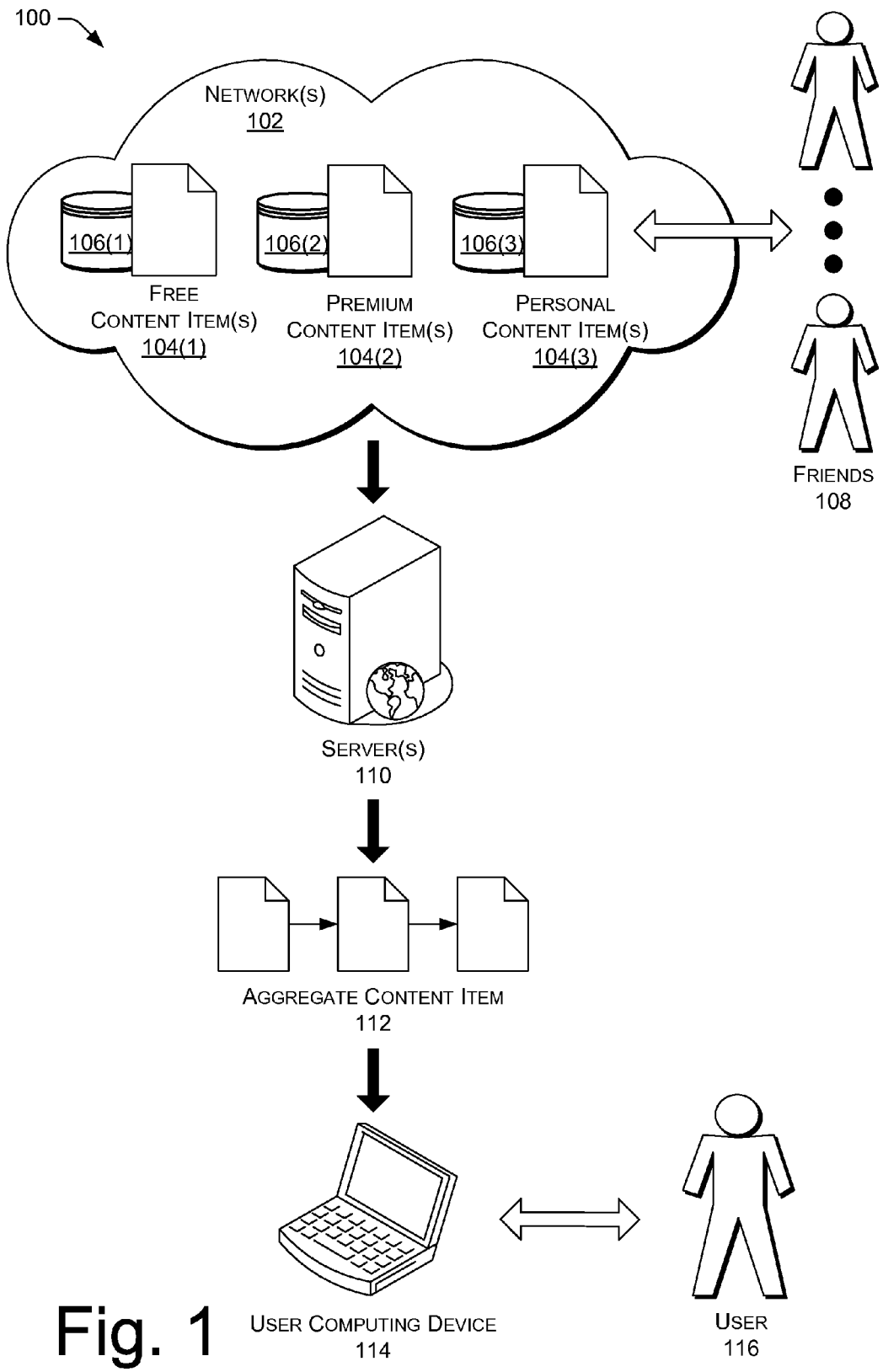
FIG. 1 shows an illustrative architecture for creating and delivering an aggregate content item to a user.

FIG. 1 shows an illustrative architecture 100 in which a system for aggregating and presenting content items may be implemented. In the architecture 100 users may obtain access to various media over a network(s) 102. Network(s) 102 may include any one or combination of multiple different types of networks, such as cable networks, local area networks, personal area networks, wide area networks, the Internet, wireless networks, ad hoc networks, mesh networks, and/or the like. The network(s) 102 may include many types of media and content such as free content items 104(1), premium content items 104(2), and personal content items 104(3). All of these are collectively referred to as content items 104. Free content items 104(1) may include such things as content from websites, RSS feeds, results of text searches, audio and video broadcasts, and the like. Premium content items 104(2) generally include any type of content items that requires payment to access. Content on certain websites, selected cable television channels, satellite radio broadcasts, are all examples of sources of premium content items 104(2). Personal content items 104(3) include content such as e-mail, text messages, and similar types of personal communications directed to a particular recipient user. The network(s) 102 may also include other types of content items 104 that may be different from or a combination of these illustrative types of content items 104.

Each content item 104 may be associated with information (e.g., metadata) that explains and identifies the content item 104. The free content item(s) 104(1) may be associated with respective metadata 106(1), the premium content item(s) 104(2) may be associated with metadata 106(2), and the personal content item(s) 104(3) may also be associated with respective metadata 106(3), collectively metadata 106. The metadata 106 may be associated with the content item(s) 104 by the vendor or creator of the content item(s) 104. Additionally or alternatively, metadata 106 may also be created by users through crowd sourcing, collaborative tagging, ranking, voting, and the like. In some implementations, the metadata 106 may be automatically extracted from the content item(s) 104. For example, optical character recognition, voice recognition, and/or image recognition of a content item 104 may be used to automatically identify keywords for inclusion in the metadata 106 of the content item 104.

The personal content items 104(3) and some aspects of the metadata 106 for each of the content items 104 (e.g., group rankings, recommendations, etc.) may be generated by a group of friends 108. The friends 108 may include friends, family, coworkers or any type of users that have a mutual relationship. The relationship may be stored as a friends list, list of e-mail contacts, or other electronic record. In some implementations, the user may enter account information for another service such as a social networking service and the identity of friends 108 may be obtained from the other service.

The content items 104, metadata 106, and friends 108 all provide sources of content and information that may be used to create personalized content aggregations such as a customized news show or a personalized newspaper. The identification, accumulation, and selection of content items for potential inclusion in a customized, aggregate content item may be performed by a computing system such as one or more server(s) 110. Other computing systems such as personal computers, cloud computing arrangements, super computers, and the like may also perform the functions of the server(s) 110.

As will be discussed in more detail below, the server(s) 110 may apply various filters, ranking and sorting algorithms, as well as incorporating direct user instructions to transform a potentially vast pool of content items 104 into a single aggregate content item 112. In some implementations, the aggregate content item 112 may be a series of video files selected from the content items 104 available on the network(s) 102. The selections of which files to include may be based on user preferences and the ordering of the separate videos within the aggregate content item 112 may be based on relevance ranking, user-specified ordering, and the like.

Ultimately the aggregate content item 112 is delivered or otherwise made available to a user computing device 114. The user computing device 114 may be implemented as any number of devices, including but not limited to a personal computer, a thin client, a network appliance, a laptop computer, a net book, an electronic book reader, a portable digital assistant (PDA), a mobile phone, a set-top box, a game console, a personal media player (PMP), a television, an automobile navigation system, and so forth. In some implementations, the user computing device 114 may itself perform the aggregation, grouping, and other analysis that is performed by the server(s) 110. In this implementation, the aggregate content item 112 itself would be generated on the user computing device 114 or links to locations of each individual content item within the aggregate content item 112 would be made accessible to the user 116.

The aggregate content item 112 may be downloaded to the user computing device 114, or the aggregate content item 112 may be stored on the server(s) 110, the network(s) 102, or other data store and a link may be provided to the user computing device 114. In one implementation, the user 116, may turn on a television and find a link for the aggregate content item 112 in a list of on-demand video features. Upon selecting the link, the aggregate content item 112 may be streamed, downloaded, or otherwise provided to the user computing device 114 for consumption by the user 116. In another implementation, the user 116 may receive a notification on an electronic book reader that his or her personalized daily newspaper is ready for viewing. Selecting a link in the notification may begin transferring all or part of the personalized daily newspaper to the electronic book reader device.

Illustrative Content Aggregation System

Figure 2:
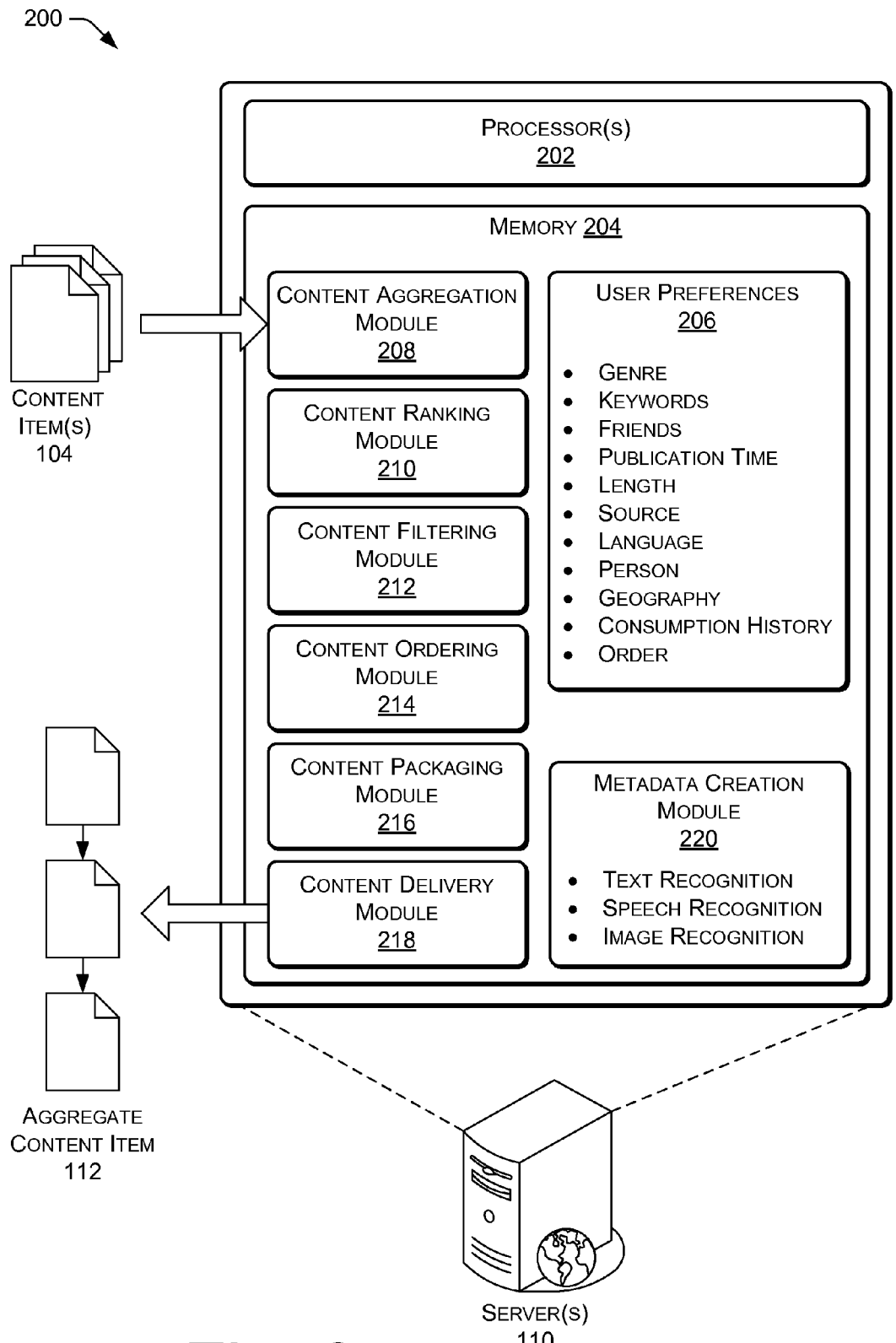
FIG. 2 shows the illustrative server from FIG. 1 in greater detail.

FIG. 2 is a schematic representation 200 of the server(s) 110 of FIG. 1. In other implementations, the server(s) 110 could be replaced by any other type of computing device and is not limited to a server computer. In a basic configuration, the server(s) 110 includes one or more processors 202 and a memory 204.

The memory 204 may include user preferences 206. In some implementations, the user preferences 206 may be stored elsewhere such as on the user computing device 114. In these implementations, the server(s) 110 may have access to information contained within the user preferences 206 via a network connection or other communication link. Alternatively, the server(s) 110 may "mirror" or make a copy of the user preferences 206 in the memory 204. Generally, the user preferences 206 include information about what type of content items 104 the user 116 wishes to consume and how the user 116 wishes to consume those content items 104. The user preferences 206 may include, for example, a genre, keywords, a friends list, a publication time, a length, a source, a language, a person, geography, consumption history, preferred order for consuming content items, or the like.

Genre is an indication of broad or specific types or categories (e.g., news, sports, comedy, etc.) of content items 104 of interest to the user 116. Keywords indicate specific words or phrases that the user 116 is seeking in content items 104. For example, the user may indicate that he or she is interested in content items 104 that include the words "Afghanistan" and "General." The friends list may include identifiers of other users with which the user 116 has a connection. The members of the friends list may be the same as the friends 108 shown in FIG. 1. The publication time may indicate an "age" content items 104 the user 116 wishes to consume (i.e., how old the content items are). For example, the user 116 may indicate that he or she wishes to see news content that was published within the last 24 hours. The publication time may also indicate that the user 116 only wishes to see older content items 104 (e.g., comedy items published during the 1970s). Length may indicate a preferred length of content item 104 (e.g., less than 30 minutes, about three minutes, etc.). Source may indicate a specific brand of content such as a publisher or creator of a content item 104 (e.g., The New York Times®, PBS®, etc.). Language may indicate a preferred language that occurs in the content item 104 (e.g., English, Spanish, Mandarin, etc.). A preference for a particular person or group may indicate an actor, personality, newscaster, reporter, author, etc. of interest to the user 116. Geography may indicate a geographic region that is relevant to the content item 104. For example, the user 116 may specify a preference for content items 104 discussing an event that occurred within 100 miles of a particular ZIP code. Consumption history may include information about the content items 104 that the user 116 has consumed in the past and how the user 116 consumed those content items 104. For example, each unique content item 104 that the user 116 has already consumed, may be marked as such so that is not presented to the user a second time. Information about which content items 104 that the user 116 has chosen not to consume or has consumed multiple times may also be included in the consumption history. The user 116 may manually enter consumption history information and/or the server(s) 110 may automatically generate consumption history based on observing user behavior.

The user preferences 206 may also include a preferred order for viewing various content items 104. The ordering preferences may indicate specific content items 104 or the order may specify general classes of content items and a preferred consumption order relative to other classes of content items 104. For example, the user 116 may indicate a preference to consume content items 104 in order of increasing length (e.g., from short to long). The user 116 may also indicate an order of genres that he or she wishes to consume (e.g., news first, then sports, and finally comedy). Other user preference 206 or other factors may also be used to order the content items 104. Multiple ordering criteria may also be combined such as, for example presenting news first with each news content item 104 ordered by length from shortest to longest, then sports with each sports content item 104 ordered by distance from near to far, and finally comedy with each comedy content item 104 order by publication time from newest to oldest.

The memory 204 may also include a content aggregation module 208. The content aggregation module 208 receives content items 104 from a plurality of sources. Some of the sources may be predetermined (i.e., the content aggregation module 208 received previous instructions to access those sources of content). Other sources may be based upon indications received from the user 116, such as the user preferences 206. In some implementations, the content aggregation module 208 may obtain copies of multiple content items 104 and keep them in the memory 204 for presentation to the user 116. The content aggregation module 208 may also locate content items 104 and note the location without storing the whole content item 104 in the memory 204.

The memory 204 may further include a content ranking module 210. The content ranking module 210 may be configured to rank the content items 104 identified by the content aggregation module 208 according to the user preferences 206. The content ranking module 210 may use any or all of the factors included in the user preferences 206. The factors may also receive different weights. For example, language may be heavily weighted so that content items 104 which are not in the user's preferred language receive a low ranking. The user 116 may manually select a weighting, initial weightings may be provided as default settings, or weightings may be derived automatically upon analysis of consumption history. The content ranking module 210 may also go beyond user generated data and rank the content items 104 according to factors such as global popularity and/or global importance. Global popularity may be indicated by user reviews including reviews from users other than the user 116 and the user's friends 108. Global importance may be determined by identifying the general topic of a content item 104 and observing how many other content items 104 also reference that same general topic. The global information may be provided by the vendor of the content item 104 and/or it may be derived by observing aggregate user behavior such as the number of times a content item 104 is e-mailed or a topic is included in a public text message (e.g., tweet). This type of importance rating may, for example, assign a widely and frequently covered news story a high importance rating. Generally, the content ranking module 210 attempts to rank the content items 104 according to how "interesting" those content items 104 will be to the user 116.

The memory 204 may also include a content filtering module 212. The content filtering module 212 may be configured to remove content items 104 that have a low ranking assigned by the content ranking module 210. In some implementations, content items 104 with less than a threshold rank may be removed or filtered out of the collection of content items 104 aggregated by the content aggregation module 208. For example, if the content items 104 are ranked between 0 and 100 with 0 being the least interesting and 100 being the most interesting, content items 104 with a rank below 80 may be removed by the content filtering module 212. Conversely, the content filtering module 212 may filter out each content item other than a certain set of highest ranking content items. For instance, the module 212 may filter out each content item other than the ten highest ranking content items, regardless of the scores for the eleventh and proceeding content items.

The memory 204 may also include a content ordering module 214. The content ordering module 214 may be configured to order the content items 104 for presentation to the user 116. The ordering may be applied only to those content items 104 that remain after removal of other content items 104 by the content filtering module 212. In one implementation, the content items may be ordered according to the order specified in the user preferences 206. In another implementation, the content items 104 may be ordered by level of interest to the user 116 (e.g., from highest rank to lowest rank). In a further implementation, nested ordering may be applied, for example, ordering the content items 104 first by the order specified by the user and then by the ranks generated by the content ranking module 210. Thus, if the user indicates an order of genres as news-sports-comedy the content ordering module 214 may present the first, second, and third highest ranked news items, followed by the first, second, and third highest ranked sports items, and then the first, second, and third highest ranked comedy items even if one of the comedy items 104 was higher ranked higher than any of the news items.

The memory 204 may include a content packaging module 216. The content packaging module 216 may be configured to assemble the content items 104 remaining after the filtering by the content filtering module 212. The content items 104 may be assembled into the aggregate content item 112 shown in FIG. 1. In some implementations, the content packaging module 216 may take data represented by several different content items 104 and combine that data into a single object (e.g., video, audio, or text file). After packaging by the content packaging module 216, it may or may not be apparent to the user 116 that the aggregate content item 112 comprises data that was formerly in several discrete content items 104. For example, articles assembled into a customized newspaper for the user 116 may be arranged and formatted so that it appears as if the customized newspaper is a unitary content item rather than each article appearing as a separate content item 104. The content packaging module 216 may also be configured to include advertisements along with the content items in the single aggregate content item 112. The advertisements may provide a source of revenue that supports creation of the aggregate content item 112 and may incentivize providers of content to allow access to their content items 104 by the content aggregation module 208.

The memory 204 may also include a content delivery module 218. The content delivery module 218 that may handle provisioning of the aggregate content item 112 to the user computing device 114. When necessary, the content delivery module 218 may convert formatting (e.g., convert file types, change screen size, change color palette, etc.) of the content items 104 into a format appropriate for the user computing device 114 on which the user 116 will consume the content. The identity of the user computing device 114 that is to receive the aggregate content item 112 may be provided as a part of the user preferences 206. In one implementation, the aggregate content item 112 may be pushed to the user computing device 114 as a file that can be accessed and consumed by the user 116. However, the user computing device 114 may lack a local memory (e.g., a thin client, a television) for storing the aggregate content item 112. Thus, in another implementation, the single aggregate content item 112 may be placed in a data store (e.g., the memory 204, another storage location on the network(s) 102, etc.) that is accessible to the user 116. For example, the content delivery module 218 may provide a link to the aggregate content item 112 and accessing the link may cause the aggregate content item 112 to be streamed to the user computing device 114. In implementations in which functions of the server(s) 110 are performed by the user computing device 114 a content delivery module 218 may be omitted.

A metadata creation module 220 may also be included in the memory 204. As discussed above, some types of metadata 106 may be created and associated with content item(s) 104 based upon automatic analysis of the content item(s) 104. Content item(s) 104 that includes text that is encoded as text may be relatively easy for a computing device such as the server(s) 110 to analyze for keywords or otherwise extract metadata 106. However, if the text is encoded as a graphic, optical character recognition (OCR) may be necessary before a computing system can recognize that text as text and create metadata 106. Similarly, content item(s) 104 that include audio or video data may also yield metadata 106 after processing with speech recognition or image recognition techniques. For example, the audio portions of video files could be analyzed with speech recognition to convert speech into text and then that text could be mined for metadata 106. Also, image recognition could be applied to static images or to videos in order to recognize objects shown in those images or videos (e.g., Brad Pitt's face, the Eiffel tower, a hippopotamus, and the like) and the identity of those objects could provide further metadata 106. Metadata creation by the metadata creation module 220 may be particularly useful for those content items 104 such as videos that are otherwise difficult to categorize and sort. In some implementations, creation of metadata 106 may enable aggregation of content from a larger number of content sources than would be possible if the server(s) 110 was limited to analyzing only metadata 106 that was already associated with the content items 104.

The memory 204 may also include additional modules or data not shown in FIG. 2. Also, any of the modules discussed above or shown in FIG. 2 may be omitted or combined with other modules. Moreover, the server(s) 110 may contain additional components that are conventionally associated with computing devices such as input/output devices, communication connections, and the like.

Figure 3:
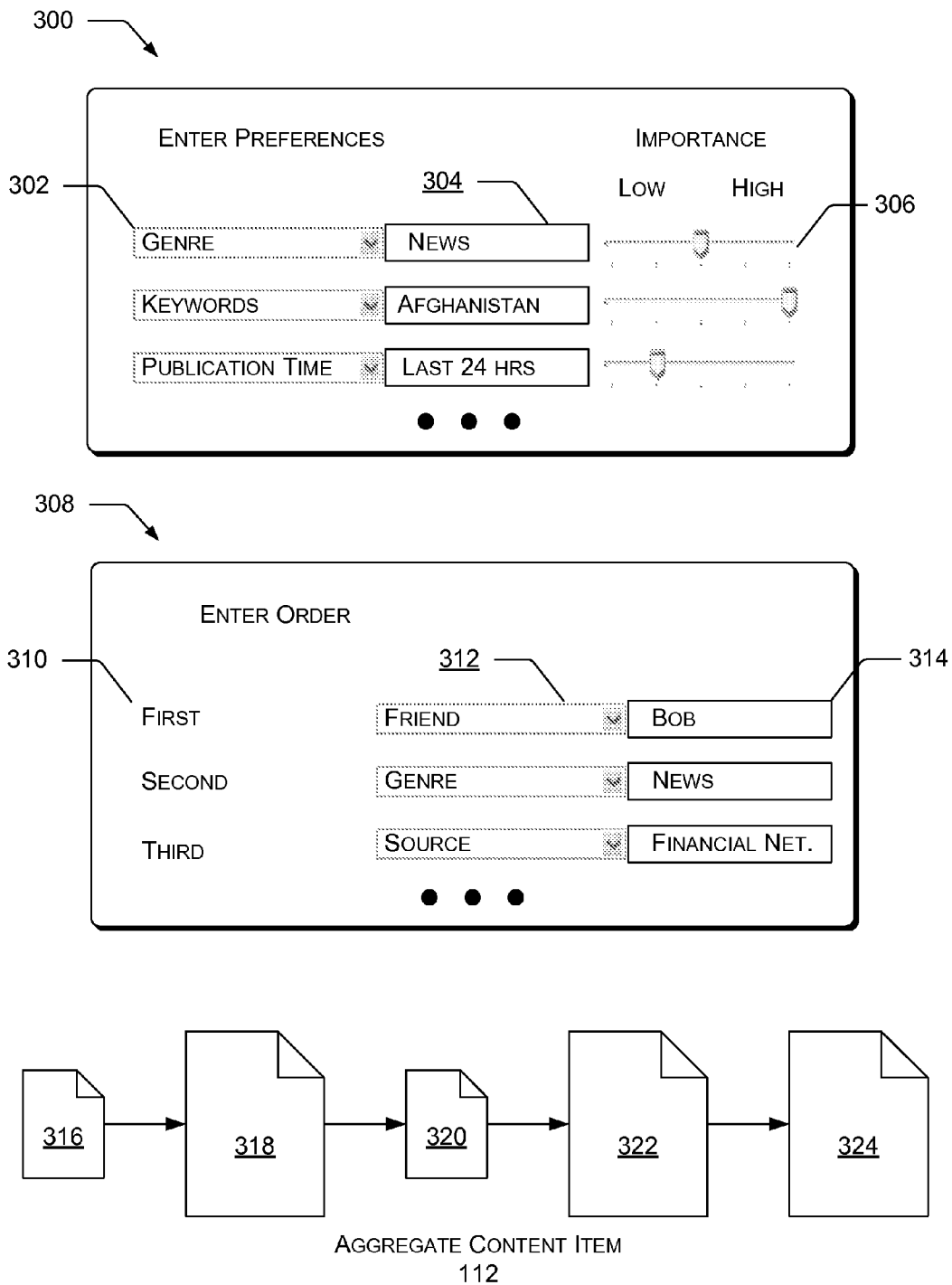
FIG. 3 shows illustrative user interfaces for entering user preferences and shows the aggregate content item from FIGS. 1 and 2 in greater detail.

FIG. 3 shows an illustrative user interface 300 for the user 116 to enter user preferences 206. By providing detailed user preferences 206 the user 116 may receive a more interesting and personalized aggregate content item 112. However, the user 116 may also be provided with an aggregate content item 112 even if he or she has not provided any user preference information. In that implementation, the server(s) 110 may identify and order content items 104 according to global factors such as global popularity and global importance.

The user interface 300 may include a series of drop-down menus 302, or other user interface elements, for the user 116 to select categories of user preferences. For example, the user 116 may select "genre," "keywords," and "publication time" as three factors for identifying a content item 104. Generally, content items 104 that closely match the information input by the user 116 are assumed to be of interest to the user 116. Any number of additional, or fewer, factors may be input in order to select a content item 104. For each of the categories, the user 116 may enter specific information in a text box 304. The text boxes 304 may be replaced by additional drop-down menu or other user interface elements. For example, if there are only a limited number of genres, and then selecting genre in the first drop-down menu 302 may lead to the display of a second drop-down menu in the location of the text box 304 from which the user 116 can pick one of the genres. In addition to allowing the user 116 to select criteria for identifying content items 104, the user interface 300 may also include a slider bar 306, or other user interface element, so that the user 116 can assign an importance value to each of the criterion. FIG. 3 shows, for example, that having the keyword "Afghanistan" located in a content item 104 is of high importance. However, identifying content items 104 published with the last 24 hours is of relatively league lower importance.

Inputs received from the user interface 300 may be stored in the user preferences 206. The criteria for determining how interesting a content item 104 is or how closely the content item 104 matches the user preferences 206 may be used by the content ranking module 210 to rank numerous content items 104 as described above. The relative weights assigned to each criterion by the slider bars 306 may also be used by the content ranking module 210 to assign ranks to each of the content items 104 gathered by the content aggregation module 208.

FIG. 3 also shows a user interface 308 for indicating a preferred consumption order. Although shown as distinct from the user interface 300 for entering preferences, both user interfaces 300 and 308 may be combined in a single user interface. In one implementation, the user interface 308 may include an ordered series of slots 310 such as first, second, third, etc. for which the user may indicate the type of content item 104 that he or she would like to consume in that slot 310. In other implementations, the slots 310 may indicate relative positions but not absolute positions. The user interface 308 for entering a preferred consumption order may also include drop-down menus 312 for selecting factors such as those included in the user preferences 206. The factors available to be selected from the drop-down menus 312 may be the same as the factors available for selection from the drop-down menus 302 in the user interface 300. Following the selection of each factor in the drop-down menus 312, the user 116 may enter information about that factor in a text box 314. As with user interface 300 the drop-down menus 312 and the text boxes 314 may be replaced with other user interface elements that allow input of similar types of information. In the FIG. 3 example, the user interface 308 shows that the user 116 has indicated a preference to see content recommended by his or her friend Bob first, followed by content items in the genre news, and then content items that come from the source "The Financial Network" third.

FIG. 3 also shows an illustrative aggregate content item 112 generated in part according to the information entered in the user interfaces 300 and 308. The aggregate content item 112 may begin with an advertisement 316. The content of the advertisement 316 may be based upon and/or related to the subsequent content item 318. However, the advertisement 316 may be unrelated to the content item 318 and the advertising spot may be allocated by bidding for the right to place the advertisement 316. In this example, the first content item 318 will be something from the user's friend Bob (e.g., a recent entry from Bob's blog or a video message sent from Bob to the user 116). This may be an example of a personal content item 104(3). The advertisement 316 may be for a product that Bob himself has recently purchased or the advertisement 316 may be related something in the content item 318 (e.g., if Bob is blogging about his car the advertisement may be directed towards automotive products).

The content item 318 is followed by another advertisement 320. This advertisement 320 may also be based upon and/or related to the subsequent content items 322, a bid amount, or other factor. For example, an advertisement such as advertisement 320 may be based upon and/or related to the previous content item 318. In some implementations, sources of content items may receive preferential rights (e.g., right of first refusal) to place advertisements adjacent to their content items. For example, the sources of content items 318 and 322 may receive priority in bidding for advertisement 320. In some implementations, revenue generated by the advertisements 316 and 320 may be shared with the sources of the adjacent content items.

Content item 322 is the second content item included in the aggregate content item 112 and in this example the user 116 indicated a preference in the user interface 308 for content item 322 to include news content. The user 116 also indicated in the user interface 300 that he or she is interested in news that contains the keyword "Afghanistan" and was published within the last 24 hours. Out of all the content items 104 collected by the content aggregation module 208, the content filtering module 212 and the content ordering module 214 may place a content item related to Afghanistan from today's news into the position represented by the content item 322. This content item 322 may be an example of a free content item 104(1) that comes from, for example, the website of a commercial news provider.

The third content item 324 is a content item that comes from "The Financial Network." The Financial Network may be a premium source of financial news that contains multiple content items. This may be an example of a premium content item 104(2). The content item selected to be included as the third content item 324 in this aggregate content item 112 may be selected out of all the content items 104 available from The Financial Network by a global factor such as global importance or by a time factor such as a most recent publication time. Since the user 116 is already paying to receive premium content from The Financial Network this content item 324 may be provided without an advertisement.

The aggregate content item 112 may be presented to the user 116 by the content delivery module 218 as a single flow of, for example, video content. In one implementation, the user 116 may choose to launch or view the aggregate content item 112 and receive an uninterrupted presentation of videos interspersed with advertisements that creates a user experience similar to watching the evening news. Thus, once the user 116 has provided user preferences 206 and the server(s) 110 has generated an aggregate content item 112, consuming the aggregate content item 112 may be a passive experience more analogous to watching TV then an interactive experience like browsing the Internet.

Operation

Figure 4:
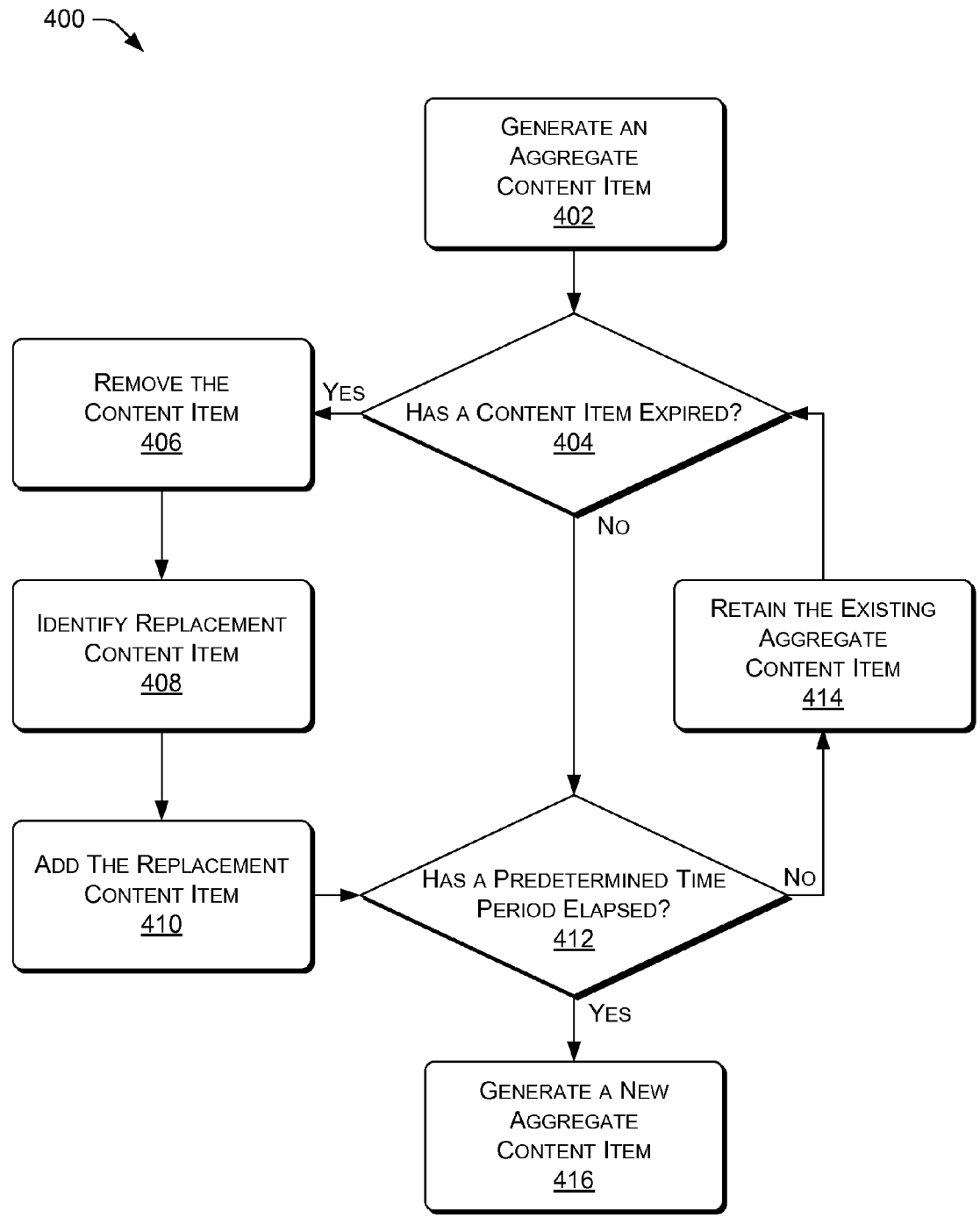
FIGS. 4-6 are flow diagrams of illustrative processes for creating aggregate content items to deliver to a user.
Figure 5:
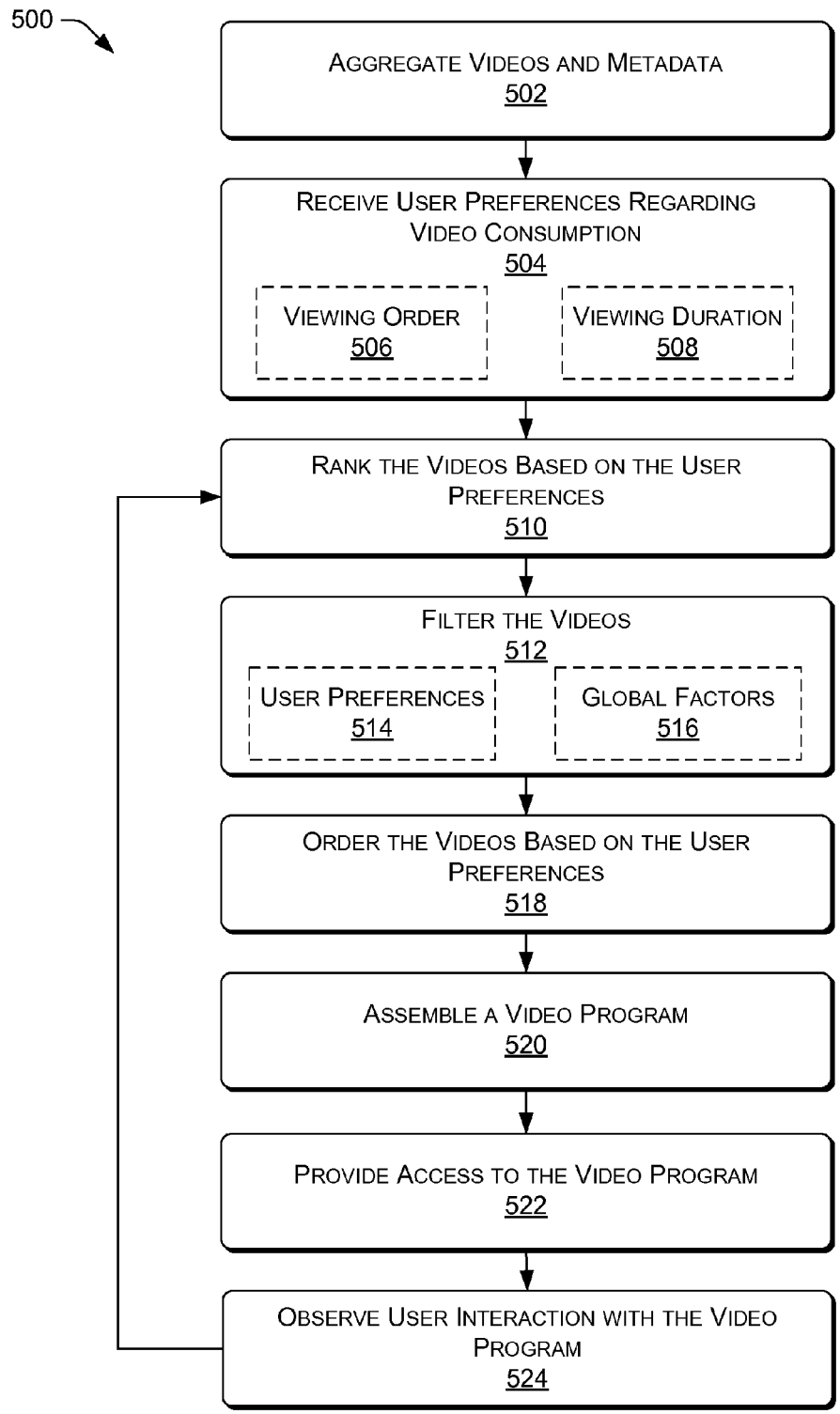

FIGS. 4-6 illustrate example processes 400, 500, and 600 for generating and presenting aggregate content items as discussed above. These processes are each illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 4 illustrates process 400, for updating all or part of the aggregate content item 112. Many of the content items 104 that may be included in the aggregate content item 112 are more likely to be interesting to the user 116 when those content items 104 are new. As such, in some situations timeliness may be the most important consideration. The user 116 may wish to receive the most recent news content even if that content does not match precisely the user preferences 206, but the user 116 may not be interested in news content from several months ago no matter how closely that news item matches the user preferences 206. Personal content items 104(3) may also change frequently as the user 116 receives notifications, recommendations, messages, and the like from his or her friends 108. Thus, an aggregate content item 112 may become stale and benefit from being replaced in whole or in part.

At 402, an aggregate content item 112 is generated. In some implementations, the aggregate content item 112 may be generated by the server(s) 110. As discussed above, the aggregate content item 112 may include a plurality of separate content items 104 each selected for inclusion in the aggregate content item 112 based on a comparison between metadata 106 and the user preferences 206.

At 404, it is determined if a decay rate for a content item 104 indicates that the content item one or has expired based on a calculation using the time the content item 104 was published, the decay rate, and a current time. The associated metadata 106 for each content item 104 may include a decay rate indicating how fast that content item 104 becomes stale. For example, news items related to arts and entertainment may become stale much slower than news items related to a stock market. In some implementations, the decay rate may be implemented as an "interestingness half-life" that may decrease a ranking assigned by the content ranking module 210 by half during one half-life (e.g., a content item 104 with an initial rating of 80 and a half-life of six hours would receive a rating of 40 once that content item 104 has been published for six hours, 20 after 12 hours, and so on). The decay rate for each content item 104 may be included in the metadata 106 by a vendor of the content item 104. The decay rate may also be assigned to a content item 104 based on the genre, publication source, etc. of that content item 104. For example, content items in the news genre may have a shorter half-life than content items in the comedy genre.

In some implementations, a content item 104 may be deemed to have expired if the ranking of the content item falls below a threshold ranking. For example, if the threshold ranking for inclusion in the aggregate content item 112 is a ranking of 50, then a content item 104 with a ranking of 40 would be treated as an expired content item. In other implementations, the expiration may be based upon a length of time from publication (e.g., a content item 104 that was first published more than 24 hours ago could be treated as an expired content item). The concept of expiration could also be based upon time or date. For example, a content item 104 could expire at midnight on a certain day. If the content item has expired, then process 400 proceeds along the "yes" path to 406. If the content item has not expired, then process 400 proceeds along the "no" path to 412.

At 406, the expired content item is removed from the aggregate content item 112. In some implementations, the content packaging module 216 may function to disaggregate the aggregate content item 112 and delete the expired content item.

At 408, a replacement content item is identified. The content ranking module 210 may identify the replacement content module by finding a highest ranked and not expired content item 104. In some implementations, the deleted content item may be replaced with one of a same or similar category. For example, if the expired content item was a news article that included the keyword "Afghanistan" that content item 104 may be replaced with another content item 104 that is not expired and has the same characteristics (e.g., the genre is news and the keywords include "Afghanistan").

At 410, the replacement content item is added to the aggregate content item 112. If the replacement content item is inserted in the same position as the deleted content item the content packaging module 216 may repackage the aggregate content item 112 with the replacement content item. If the replacement content item is not necessarily inserted in the same position as the deleted content item, the content ordering module 214 may apply rules to establish an order for all the content items 104 included in the aggregate content item 112.

At 412, it is determined if a predetermined time period for generating a new aggregate content item 112 has elapsed. The predetermined time period may be specified by the user 116 (e.g., three hours, one day, two days, one week, etc.). At each interval indicated by the predetermined time period (e.g., daily, weekly, etc.) the aggregate content item 112 may be re-created. The predetermined time period may also be a default time period or one generated by the server(s) 110. When the predetermined time period has elapsed, process 400 proceeds along the "yes" path to 416. When the predetermined time period has not elapsed, process 400 proceeds along the "no" path to 414.

At 414, when the predetermined time period has not yet elapsed, the existing aggregate content item 112 is retained. This portion of process 400 may repeat and update individual content items 104 as they expire, but retain the aggregate content item 112 until the predetermined time. Thus, from 414 process 400 returns to 404. Expiration of every individual content item may be functionally analogous to replacing the whole aggregate content item 112. In some implementations, the aggregate content item 112 may not have a time period for replacement of the whole thing, but the aggregate content item 112 may be replaced piece by piece as each individual content item expires and is itself replaced.

At 416, when the predetermined time period has elapsed, a new aggregate content item may be generated, for example, by the server(s) 110. Periodically replacing the entire aggregate content item 112 may ensure that individual content items 104 which do not have a decay rate (i.e., never go stale) will not remain indefinitely. In some implementations, scanning of content sources for new content items 104 by the content aggregation module 208 may be triggered by deletion of the aggregate content item 112 and the request to generate a new aggregate content item 112.

FIG. 5 illustrates process 500 for creating video aggregations and refining a filtering algorithm based on user feedback. At 502, videos and the associated metadata are aggregated from a plurality of content sources. The content sources may include free commercial content sources, paid commercial content sources to which the user 116 has a subscription, and content sources provided by friends 108 of the user 116. The aggregation may be performed by the content aggregation module 208. The aggregation of metadata 106 may include copying metadata 106 provided by other sources and/or creating metadata 106 for the videos. As discussed above, metadata 106 may be created by the metadata creation module 220 based upon analysis of speech, text, or images in the videos. The metadata 106 for a video include multiple types of information such as genre, keywords, identity of the video vendor, the name of a person appearing in the video, a time of publication, a geographical location of relevance to the video, a language used in the video, a global popularity, an importance rating, popularity among the user's friends 108, and the like.

At 504, user preferences 206 regarding video consumption are received. The user preferences 206 may be entered in either of the user interfaces 300 shown in FIG. 3 and stored in the memory 204 of the server(s) 110. In some implementations, the user preferences 206 may also include a viewing order 506 and a viewing duration 508. The viewing order 506 may be communicated via a user interface such as the user interface 308 shown in FIG. 3. The viewing duration 508 may indicate a maximum or approximate length of media content that the user 116 wishes to view. For example, the user 116 may wish to see approximately 30 minutes of videos when watching his or her customized, aggregate content item 112.

At 510, the videos are ranked based on the user preferences received at 504. The ranking may be performed by the content ranking module 210. Deriving a ranking for each video may be accomplished by comparing the metadata 106 associated with the video with the user preferences 206 to determine a degree of correlation between the two and ranking the videos in order of the degree of correlation. Videos with a higher degree of correlation (i.e., those that more closely match the user preferences 206) may receive a higher ranking.

At 512, the aggregated videos are filtered based on one or both of user preferences 514 or global factors 516. Filtering by user preferences 514 may comprise using the information received at 504 to generate one or more filters. Filtering by user preferences 514 may be highly specific for each individual user, but filtering by global factors 516 may lead to similar or the same results for different users. The global factors 516 may comprise a global popularity and/or a global importance. In some implementations, global popularity may be based on public ranking or reviews of the videos (e.g., thumbs-up/thumbs down, 0 to 5 star rankings, and the like). Global importance may be determined by identifying the topic of each video and the total number of other videos from other sources that cover the same topic. In some implementations, numerosity alone may be used to infer importance (i.e., each video that references the same topic receives one count and videos with the highest number of counts are deemed most important).

At 518, the videos are ordered based on the user preferences received at 504. When the user 116 indicates a specific viewing order 506 the videos may be ordered in that manner. The ordering may also be based on the rank assigned to the videos at 510. When the user preferences 206 do not contain an explicit ordering 506 or sufficient information to infer an ordering from other user preferences 206, the videos may be placed in a default order (e.g., chronologically, by global importance, by global popularity, and the like). Default ordering procedures may also be used as a tiebreaker when two videos receive identical rankings. In some implementations, the content ordering module 214 may determine an order for the videos.

At 520, a video program is assembled. The video program may be assembled by the content packaging module 216. The video program may function such that once playback is begun each video smoothly transitions in a linear order to the next video. Changes from one video to a next in the video program may be indicated as tracks or chapters that the user 116 can move to quickly by a skip forward or skip backwards command. Assembling the video programming at 520 may also comprise including advertisements in the video program. In some implementations, assembling the video program may include limiting a length of the video program to the preferred viewing duration 508 received at 504. For example, if the user 116 indicates that the desired length of the video program is half an hour, then assembling the video program may remove items (e.g., videos and/or advertisements) that would increase the total length beyond half an hour.

At 522, access is provided to the video program. The access may be provided by the content delivery module 218 either by sending or by making the program available to the user computing device 114.

At 524, user interaction with the video program is observed. The user 116 may skip over portions of the video program and this may be interpreted as an indication that those videos were of low interest to the user 116. The user 116 may also watch certain videos more than once and this may be interpreted as those videos having high interest to the user 116. Also, the time of day and day of the week when the user 116 views the video program may be observed. The user 116 may stop the video program partway through. The time when the user 116 stops playback and any difference based on time of day or day of may be used to modify total length of the video program (e.g., video programs are watched for about a half hour on weekdays but for about one hour on weekends, this may be used to adjust the length of program put together on different days). The user 116 may also interact with the videos by actively rating (e.g., thumbs-up/thumbs down, good/neutral/bad, etc.) a video in the video program. All of these and other types of user interactions may be observed and recorded as a part of the user preferences 206 and/or as additional factors to be considered by the content ranking module 210.

Following 524, process 500 may return to 510 and modify subsequent rankings based on the observations. This modification may iteratively improve the rankings, and thus, the videos provided to the user 116 over time. For example, videos similar to a video that the user 116 skipped or gave a low ranking may have points subtracted from the score that the content ranking module 210 would have otherwise assigned.

Figure 6A:
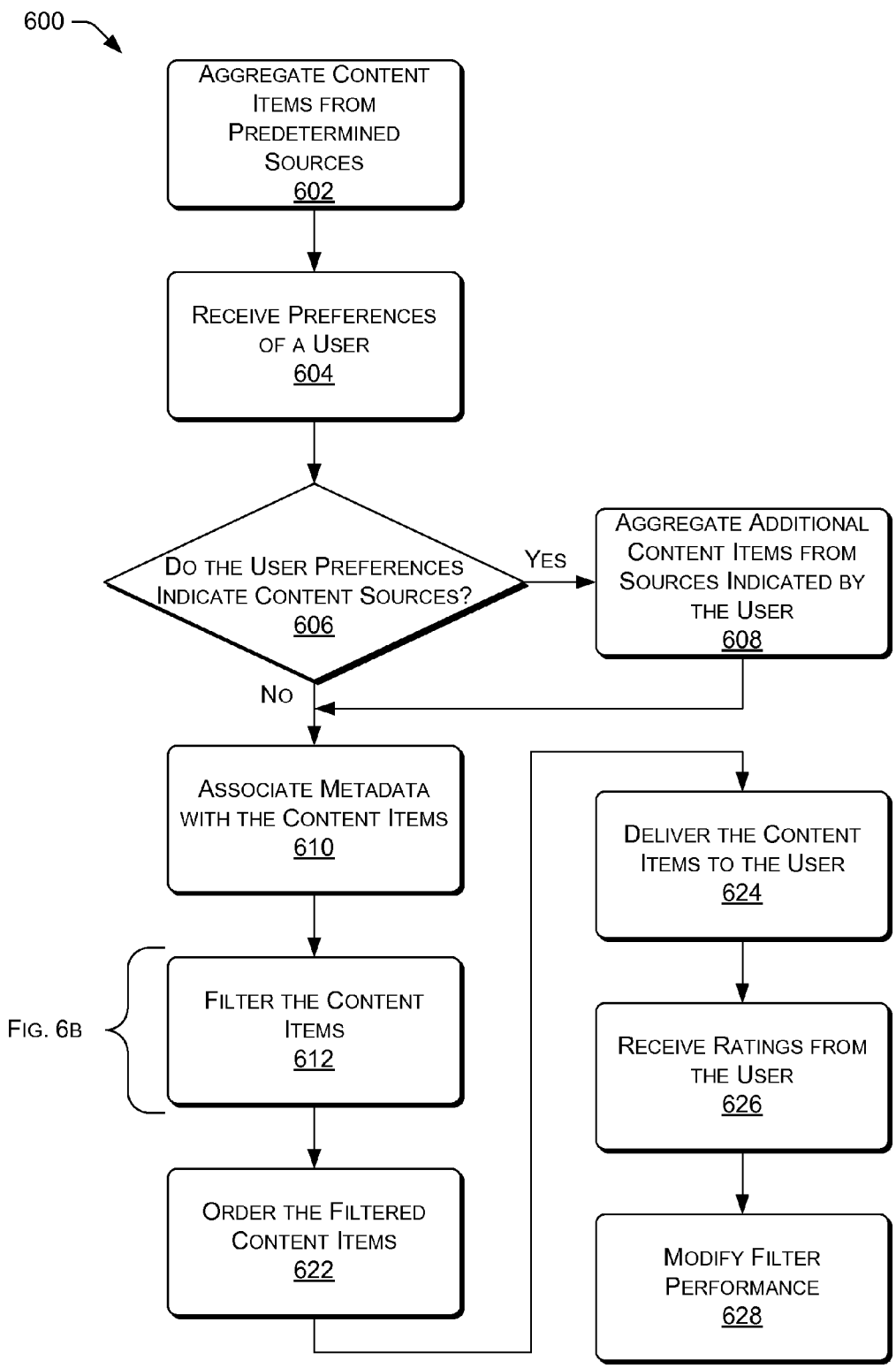
Figure 6B:
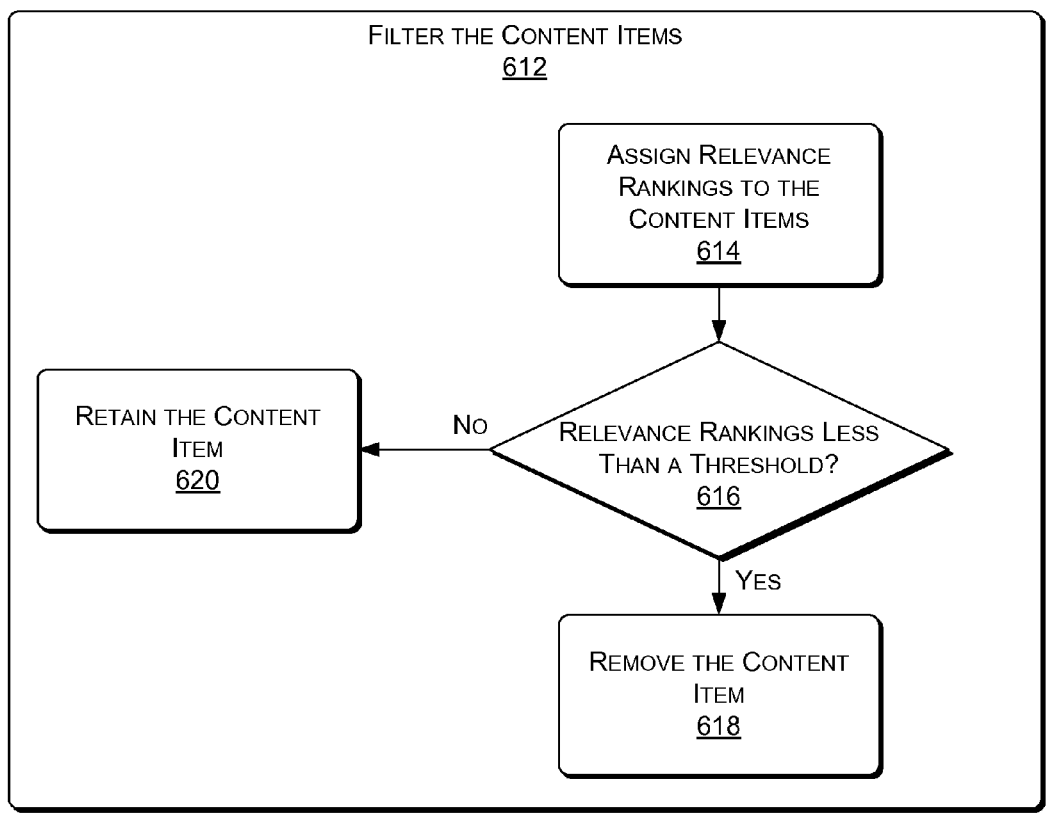

FIGS. 6a and 6b illustrates process 600 for aggregating content items 104 and delivering an aggregation of those content items to the user 116. At 602, content items 104 are aggregated from a plurality of predetermined content sources. The predetermined content sources may be selected based on quality or diversity of content items 104 provided by those content sources. In some implementations, the predetermined content sources may be selected based on business relationships. For example, a system that creates an aggregation of content items 104 (e.g., an operator of the server(s) 110) may have agreements with selected content sources to provide content. Regardless of the factors on which the pre-determination is made, the predetermined content sources may be known before there is a request or a need to create an aggregation of content items 104.

At 604, preferences of the user 116 are received. The user 116 may communicate his or her preferences by entering information in a user interface such as the user interface 300 shown in FIG. 3. The preferences of the user 116 may also be received by accessing information about user behavior and deriving preference information. For example, the user 116 may provide access information (e.g., username and password) to multiple online or electronic accounts and information from each of those accounts (e.g., movie viewing history, magazine subscriptions, subscribed RSS feeds, shopping history, etc.) may be mined to infer preferences of the user 116. The preferences of the user 116 may include many types of information such as preferred genres, preferred topics, preferred keywords, preferred personalities, preferred geographical locations, preferred languages, preferred sources of content, preferred length of a content item, preferred publication time, preferred popularity level, preferred importance rating, or the like.

At 606, it is determined if the preferences of the user 116 received at 604 indicate preferred sources of content. If the user has indicated preferred sources of content different from the predetermined sources of content, process 600 proceeds along the "yes" path to 608. Otherwise, process 600 proceeds along the "no" path to 610.

At 608, additional content items from the preferred content sources indicated by the user 116 are also aggregated. The content sources received as part of the preferences of the user at 604 may not be known at the time when content items 104 are aggregated from the predetermined content sources. Thus, if the user 116 has indicated special or preferred sources of content, process 600 may aggregate content items at both 602 and 608.

At 610, metadata 106 is associated with the content items 104. Associating metadata 106 with the content items 104 may comprise identifying information generated by at least one of a vendor of the content item 104, other users, an automatic metadata extraction algorithm, or other source of information about the content item 104. The information is associated with the relevant content item 104 creating a list for grouping of content items 104 with associated metadata 106 that can be analyzed to provide customized content for the user 116.

At 612, the content items 104 are filtered based on the preferences of the user 116 and the metadata 106. Prior to filtering, there may be too many content items 104 for the user 116 to consume in a reasonable period of time. Given the vast amounts of information available on the Internet, it is conceivable that every possible content item 104 which matches one of the preferences of the user 116 may be so numerous that it could take months or years for a single individual to consume all those content items 104. In some implementations, filtering the content items 104 may comprise comparing the preferences of the user 116 to the metadata 106 and removing content items 104 for which the associated metadata 106 does not match the user preferences. For example, if the user 116 indicates that he or she only wishes to consume content items in the English language than every content item 104 in another language may be removed by the filtering.

At 614, shown in FIG. 6b, the filtering may comprise assigning a relevance ranking to the content items 104. The relevance ranking may be based on a degree of correspondence between the metadata 106 and each aspect of the preferences of the user 116. Different weights may be applied to different aspects of the preferences of the user 116. For example, a match based on language may be weighted more heavily than a match based on genre. The user 116 may specify how heavily to weight different aspects of the preferences of the user 116 by, for example, indicating an importance such as in the user interface 300 shown in FIG. 3. In some implementations, the filter may be a threshold level or number derived from the relevance ranking Other filtering algorithms and techniques are also possible.

At 616, is determined if the relevance rankings for one or more content items are less than the threshold level. If the rankings are less than the threshold level, then process 600 proceeds along the "yes" path to 618. At 618, content items 104 with the relevance ranking less than the threshold may be removed. Removal does not necessarily require deletion of the content item 104. The content item 104 and the associated metadata may be retained for possible later delivery to the user 116.

When the content items 104 have a relevance ranking greater than the threshold, the content items 104 are retained and process 600 proceeds along the "no" path to 620. At, 620, the content item 104 is retained for possible later delivery to the user 116.

Returning to FIG. 6b, at 622, the filtered content items are ordered based on the relevance ranking assigned at 614 and/or an ordering explicitly designated by the user 116. The order specified by user 116 may be based on factors evident from the metadata 106 such as keywords, source of the content, publication times, and the like (e.g. show the short content items before long content items, show the recent content items before the older content items, etc.). Ordering of the content items 104 based on the relevance ranking may comprise presenting the content items 104 in order of ranking from high to low (i.e., most relevant first and least relevant last).

At 624, the ordered and filtered content items 104 are delivered to the user 116. The content items 104 which were not removed by the filter at 612 are presented in the order determined at 622. In some implementations, the content items 104 may be delivered separately or streamed to the user computing device 114 in the specified order. In other implementations, the content items 104 may be delivered as a single item aggregate content item 112 that includes as sub-portions each of the content items 104 in the specified order.

At 626, ratings are received from the user 116 about previously consumed content items 104. The previously consumed content items 104 may be content items 104 that were just delivered to the user 116 at 624 or content items 104 delivered earlier. The user ratings may be simple such as a thumbs-up or thumbs down or relatively complex such as ranking each content item 104 from 0 to 100 on multiple scales (e.g. appropriate length, general interest, accuracy, timeliness, etc.).

At 628, the filter performance at 612 may be modified based on the ratings received at 626. Generally, content items 104 with features similar to those that received high ratings will be more likely to make it through the filter upon subsequent analysis and content items 104 that received low ratings will be more likely to be removed by the filter. Depending on the degree of complexity and detail provided in the user ratings, changes to the filter performance may be equally detailed or subtle. Process 600 may generate aggregations of content items 104 for delivery to the user 116 at regular frequencies such as every day, every other day, every week, etc. With each modification of filter performance, the filter may become more accurate based on the user ratings so that the user 116 is receiving those content items which are of greatest interest to him or her.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   under control of one or more computer systems configured with executable instructions,
   aggregating videos from a plurality of content sources;
   determining one or more keywords for the videos based at least in part on an analysis of content from the videos;
   selecting at least a portion of the videos by filtering the videos based at least in part on the one or more keywords;
   receiving user preferences regarding video consumption;
   ranking the at least the portion of the videos based at least in part on the user preferences;
   assembling a video program of content from the at least the portion of the videos based at least in part on the user preferences and the one or more keywords; and
   providing a user access to the video program.

2. The method of claim 1, wherein the aggregating the videos comprises obtaining the videos and metadata associated with the videos from content sources including at least one of a free commercial content source, a paid commercial content source, or a content source provided by friends of the user that are identified in a contacts list associated with the user.

3. The method of claim 1, wherein the aggregating the videos includes obtaining metadata associated with the videos, the metadata comprising at least one of a genre, keywords, an identity of a vendor of a respective video, a name of a person appearing in the respective video, a time of publication of the respective video, a duration of the respective video, a geographic location associated with the respective video, a language of the respective video, a global popularity of the respective video, an importance rating of the respective video, or a popularity of the respective video among friends of the user.

4. The method of claim 1, wherein the aggregating the videos includes obtaining metadata associated with the videos, and wherein the ranking the videos based at least in part on the user preferences comprises:
   comparing the metadata associated with the videos with the user preferences;
   determining a degree of correlation between the metadata and the user preferences; and
   ranking the videos in order of the degree of correlation.

5. The method of claim 1, wherein the method further comprises sequentially ordering the at least the portion of the videos based at least in part on the user preferences and the ranking of the at least the portion of the videos, the user preferences specifying a preferred consumption order based at least in part on one or more genres of the videos.

6. The method of claim 1, wherein individual ones of the ranked videos are associated with a respective decay rate used to generate a respective value for a respective video; and further comprising:
   excluding at least one of the individual ones of the ranked videos in response to respective value for the at least one of the individual ones of the ranked videos not satisfying a threshold value;
   determining that a period of time corresponding to the decay rate has elapsed for at least one of the ranked videos that was not excluded; and
   in response to the determining that the period of time has elapsed, decreasing, according to the respective decay rate, the respective value for the at least one of the ranked videos that was not excluded.

7. The method of claim 1, wherein the aggregating the videos further comprises filtering the videos based at least in part on global factors comprising at least one of a global popularity or a global importance of each respective video.

8. The method of claim 1, further comprising observing user interaction with the linear video program, and modifying a subsequent ranking based at least in part on the observations.

9. The method of claim 1, further comprising ordering the videos based at least in part on the user preferences and the ranking the videos, the user preferences specifying a preferred consumption order based at least in part on a duration of the video.

10. The method of claim 1, wherein assembling a linear video program of the ranked videos comprises including advertisements between the ranked videos.

11. A computing device comprising:
 one or more processors; and
 a memory coupled to the one or more processors, the memory storing computer readable instructions that, when executed by the one or more processors, causes the one or more processors to:
  store preferences of a user in the memory, the preferences of the user comprising genres of interest to the user, identities of friends identified in a contacts list of the user, consumption behavior of the friends, and past consumption history of the user;
  identify content items from a plurality of predetermined content sources;
  assign a ranking to the identified content items at least in part according to the genres of interest, the consumption behavior of the friends, and the past consumption history;
  determine that at least a portion of the identified content items have a ranking that satisfies a threshold rank; and
  format the at least the portion of the identified content items as a single content item instead of separate content items.

12. The computing device of claim 11, wherein the preferences of the user further comprise at least one of keywords of interest, publication time, content item length, content source, person, geographical area, and language.

13. The computing device of claim 11, wherein the predetermined content sources include private sources of content sent from at least one of the friends.

14. The computing device of claim 11, wherein the memory storing the computer readable instructions further causes the one or more processors to rank the content items identified for the plurality of predetermined content sources at least in part according to a global popularity and a global importance.

15. The computing device of claim 11, wherein the memory storing the computer readable instructions further causes the one or more processors to apply a different weight to two or more factors used in the ranking.

16. The computing device of claim 11, wherein the memory storing the computer readable instructions further causes the one or more processors to include advertisements between the content items included in the single aggregate content item.

17. The computing device of claim 11, wherein the memory storing the computer readable instructions further causes the one or more processors to order the identified content items according to the ranking assigned to the identified content items.

18. The computing device of claim 17, wherein the memory storing the computer readable instructions further causes the one or more processors to order the identified content items based at least in part on the preferences of the user specifying an order based at least in part on the genres of interest.

19. The computing device of claim 11, wherein the memory storing the computer readable instructions further causes the one or more processors to:
 format the single content item for a user computing device designated by the preferences of the user and send the single content item to the user computing device; or
 place the single content item in a data store accessible by a user, and
 provide the user a link to the single content item.

20. The computing device of claim 11, wherein the memory storing the computer readable instructions further causes the one or more processors to:
 analyze the content items; and
 create metadata based at least in part on the analysis, the analysis comprising at least one of text recognition, speech recognition, and image recognition.

21. The computing device of claim 11, wherein the memory storing the computer-readable instructions further causes the one or more processors to modify a length of the single content item based at least in part on an observed user interaction with the single content item.

22. The computing device of claim 11, wherein the memory storing the computer-readable instructions further causes the one or more processors to filter the identified content items based at least in part on a comparison between the preferences of a user and metadata associated with one or more content items of the identified content items.

23. One or more computer-readable storage media storing instructions that, when executed by one or more processors, cause the one or more processors to perform acts comprising:
 aggregating a plurality of content items from a plurality of predetermined content sources;
 receiving preferences of a user;
 determining metadata for at least a portion of the plurality of content items, wherein metadata for a content item of the plurality of content items includes a decay rate indicating a rate at which a value for the content item diminishes over time;
 filtering the plurality of content items based at least in part on one or more of the preferences of the user and the metadata;
 ordering the filtered plurality of content items based at least in part on a relevance ranking or an ordering explicitly designated by the user; and
 delivering the ordered, filtered plurality of content items to the user.

24. The media of claim 23, wherein receiving the preferences of the user comprise receiving at least one of preferred genres, preferred topics, preferred keywords, preferred personalities, preferred geographical locations, preferred languages, preferred sources of content, preferred length of a content item, preferred publication time, preferred popularity level, or preferred importance rating.

25. The media of claim 23, further comprising aggregating additional content items from preferred sources of content items when the preferences of the user include preferred sources of content items.

26. The media of claim 23, wherein the determining the metadata comprises identifying information generated by at least one of, a vendor of a content item, other users, and an automated metadata extraction algorithm, and wherein the acts further comprise associating that information with a respective portion of the at least a portion of the plurality of content items.

27. The media of claim 23, wherein the filtering the plurality of content items comprises comparing the preferences of the user to the metadata associated with each of the at least a portion of the plurality of content items, and removing a particular content item for which the metadata associated with the particular content item does not match the preferences of the user.

28. The media of claim 27, wherein one or more of the preferences of the user include a plurality of user defined specifications; and the filtering the at least a portion of the plurality of content items further comprises assigning a relevance ranking to each content item of the at least a portion of the plurality of content items, the relevance ranking based at least in part on a degree of correspondence between the metadata associated with each content item of the at least a portion of the plurality of content items and a weighting applied to each user defined specification of the plurality of user defined specifications of the preferences of the user.

29. The media of claim 28, wherein the filtering the plurality of content items further comprises removing a content item when the content item does not satisfy a threshold relevance ranking.

30. The media of claim 23, wherein the acts further comprise:

receiving ratings from the user about previously consumed content items; and modifying filter performance based at least in part on the ratings.

31. The media of claim 23, wherein the decay rate associated with the one content item is based at least in part on a genre of the one content item.

32. The media of claim 23, wherein the decay rate associated with the one content item is based at least in part on a publication source of the one content item.

* * * * *